United States Patent
Lenzing et al.

(10) Patent No.: US 6,851,309 B2
(45) Date of Patent: Feb. 8, 2005

(54) DEVICE FOR DETERMINING AT LEAST ONE PARAMETER OF A FLOWING MEDIUM

(75) Inventors: Thomas Lenzing, Benningen (DE); Uwe Konzelmann, Asperg (DE); Henning Marberg, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 10/111,858
(22) PCT Filed: Aug. 25, 2001
(86) PCT No.: PCT/DE01/03258

§ 371 (c)(1),
(2), (4) Date: Sep. 3, 2002

(87) PCT Pub. No.: WO02/18886

PCT Pub. Date: Mar. 7, 2002

(65) Prior Publication Data

US 2003/0046977 A1 Mar. 13, 2003

(30) Foreign Application Priority Data

Aug. 30, 2000 (DE) .......................... 100 42 400

(51) Int. Cl.⁷ ................................. G01F 1/68
(52) U.S. Cl. .................................... 73/204.22
(58) Field of Search ................... 73/204.22, 118.2, 73/204.21, 204.23

(56) References Cited

U.S. PATENT DOCUMENTS

| 4,981,035 A | * | 1/1991 | Hall ........................... 73/118.2 |
| 5,892,146 A | | 4/1999 | Kobayashi et al. |
| 6,085,587 A | * | 7/2000 | Konzelmann ................ 73/202 |
| 6,336,360 B1 | * | 1/2002 | Weber ..................... 73/204.21 |

FOREIGN PATENT DOCUMENTS

| DE | 195 24 634 | 1/1997 |
| DE | 197 38 337 | 3/1998 |
| DE | 197 35 664 | 2/1999 |
| DE | 197 35 891 | 2/1999 |
| DE | 198 15 654 | 10/1999 |
| DE | 199 42 502 | 3/2001 |
| GB | 2 310 383 | 8/1997 |
| GB | 2 328 514 | 2/1999 |

* cited by examiner

Primary Examiner—Edward Lefkowitz
Assistant Examiner—Jewel V. Thompson
(74) Attorney, Agent, or Firm—Kenyon & Kenyon

(57) ABSTRACT

A device for determining at least one parameter of a flowing medium. The device including an element, for example in the form of a bulge, in the channel in which the measuring element is positioned, which deflects the foreign particles and thus protects the measuring element.

22 Claims, 5 Drawing Sheets

DEVICE FOR DETERMINING AT LEAST ONE PARAMETER OF A FLOWING MEDIUM

This application is a 371 of PCT/DE01/03258 Aug. 25, 2001.

FIELD OF THE INVENTION

The present invention relates to a device for determining at least one parameter of a flowing medium.

BACKGROUND INFORMATION

A device including a measuring channel is referred to in German Published Patent Application No. 197 35 891, which houses a measuring element around which the medium entering flows. The measuring channel is slanted at a selected angle in relation to a lengthwise axis of the line, so that the inlet channel includes a region shadowed from a main flow direction. The measuring element is positioned in the shadowed region of the measuring channel in order to avoid fouling and resulting defects of the measuring element.

As a consequence of water entering the intake line, e.g., due to a roadway wet with rain, or the entry of particles, contamination of the measuring element may occur. Natural dissolved salt components contained in this splashed water then produce drift of the characteristic of the measuring element as a consequence of the formation of salt encrustations on the membrane of the sensor part. The particles may damage or even destroy the measuring element. A protected region is formed by the slant of the measuring body, but liquids or particles reach the measuring channel regardless.

A hot-wire airflow meter, referred to in German Published Patent Application No. 197 38 337 and U.S. Pat. No. 5,892,146, includes a bulge upstream from the measuring element which is configured in one piece with a wall of the line. This bulge is not configured in a measuring channel and is not used to deflect liquids or particles.

A measuring device is referred to in German Published Patent Application No. 198 15 654, in which a measuring channel includes a bulge which protects the measuring element from particles. However, this bulge is not used to deflect liquids or particles, so that they may continue to arrive in the channel.

A device is referred to in German Published Patent Application No. 197 35 664 and GB Patent No. 232 85 14, in which the measuring element is positioned inside a tubular body which the medium flows through, an upstream end of the tubular body extending into a filter chamber and including inlet openings on a lateral surface there, in order to reduce the impingement of dirt particles or water droplets on the measuring element. Particularly in the event of very polluted air and a high proportion of water in the intake air of the internal combustion engine, there is the danger of the air filter being soaked with water, which then penetrates through the filter mat and carries along dirt particles at the same time. On the downstream side of the air filter, the actual clean side, the danger arises as a consequence that the intake air again pulls along dirt particles and water droplets from the filter surface, which are then deposited in an undesired manner on the measuring element and result in erroneous measurements or failure of the measuring element. The tubular body of other prior systems reduces the danger of deposits on the measuring element through the arrangement of inlet openings on the lateral surface, however, a correspondingly long configuration of the tubular body causes an undesired pressure drop, which results in reduction of measuring sensitivity. In addition, the reduction of impingement of the measuring element with liquid/solid particles may hardly be ensured at a very high liquid intake of approximately 20 liters/hour.

During the operation of the device, it may occur that, for example, oil droplets or oil vapor are carried along in the air against the main flow direction and the measuring element is contaminated, which significantly worsens the measuring properties. Reasons for the backflow of liquids are, for example, pulsating flows or running on of a turbo charger in the shutdown phase. The inner surface of a protective grid, which is configured including a special wide mesh, is not sufficient as a condensation surface for the liquid.

SUMMARY OF THE INVENTION

The exemplary device according to the present invention includes at least one measuring element protected from the impingement of liquids and particles.

A channel includes a bulge upstream from the measuring element, which deflects the liquids and particles carried along in the medium and thus protects the measuring element from contamination.

The channel includes a rejection grid upstream from the measuring element, which deflects the liquid and particles flowing in and thus protects the measuring element from contamination.

Furthermore, the channel includes an outlet opening for the liquids and particles between the element for deflecting liquids and particles and the measuring element, so that they leave the channel and may no longer contaminate the measuring element.

The channel includes an indentation, because in this manner the deflected liquids and particles are collected and flow resistance in the channel is not increased.

A starting region of the channel is arranged such that it is radially offset, this protects the measuring element from the liquids and particles.

Through an oil rejection grid in at least one opening of the channel, oil may be prevented from penetrating the channel and damaging the measuring element.

For manufacturing the device the channel is configured in two parts and, for example, an attachable sleeve is used as one part.

Negative influence of pulsating airflow, i.e., backflows in the line, on the measuring behavior of the measuring element may be reduced by a pulsation channel.

DETAILED DESCRIPTION

Figure 1:
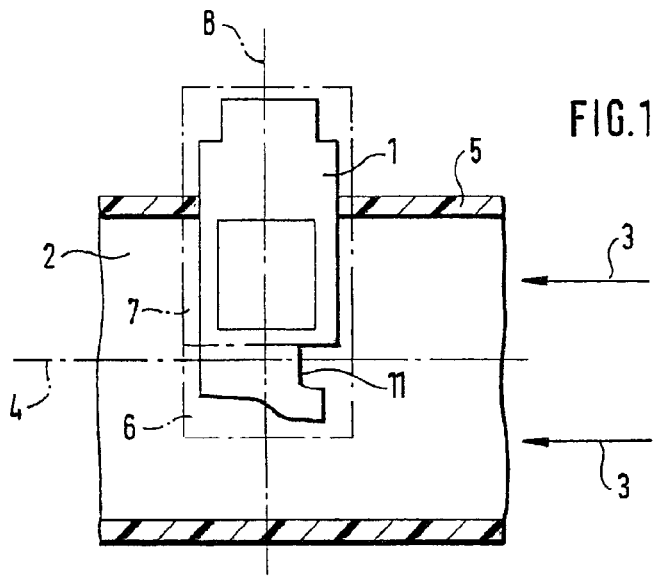
FIG. 1 shows a device for determining at least one parameter of a flowing medium in the installed state.

FIG. 1 schematically shows how a device 1 is installed in a line 2, in which the medium to be measured flows. Device 1 for determining at least one parameter includes a measuring housing 6, identified by a lower rectangle indicated by a dot-dash line, and a carrier part 7, identified by an upper rectangle indicated by a dot-dash line, in which, for example, analyzing electronics are housed. In this exemplary embodiment of device 1, a measuring element (FIG. 2) is used, which, for example, determines the volume rate of flow of the flowing medium. Further parameters which could be measured are, for example, the pressure, the temperature, a concentration of a medium component, or a flow speed, which may be determined using suitable sensors.

Measuring housing 6 and carrier part 7 have a shared longitudinal axis 8, which runs in the direction of installation and may, for example, also be the center line. Device 1 is, for example, pluggably inserted into a wall 5 of line 2. Wall 5 delimits a flow cross-section of line 2, in whose center a center line 4 extends in the direction of the flowing medium parallel to wall 5. The direction of the flowing medium, referred to in the following as the main flow direction, is identified by corresponding arrows 3 and runs from left to right in this case.

Figure 2:
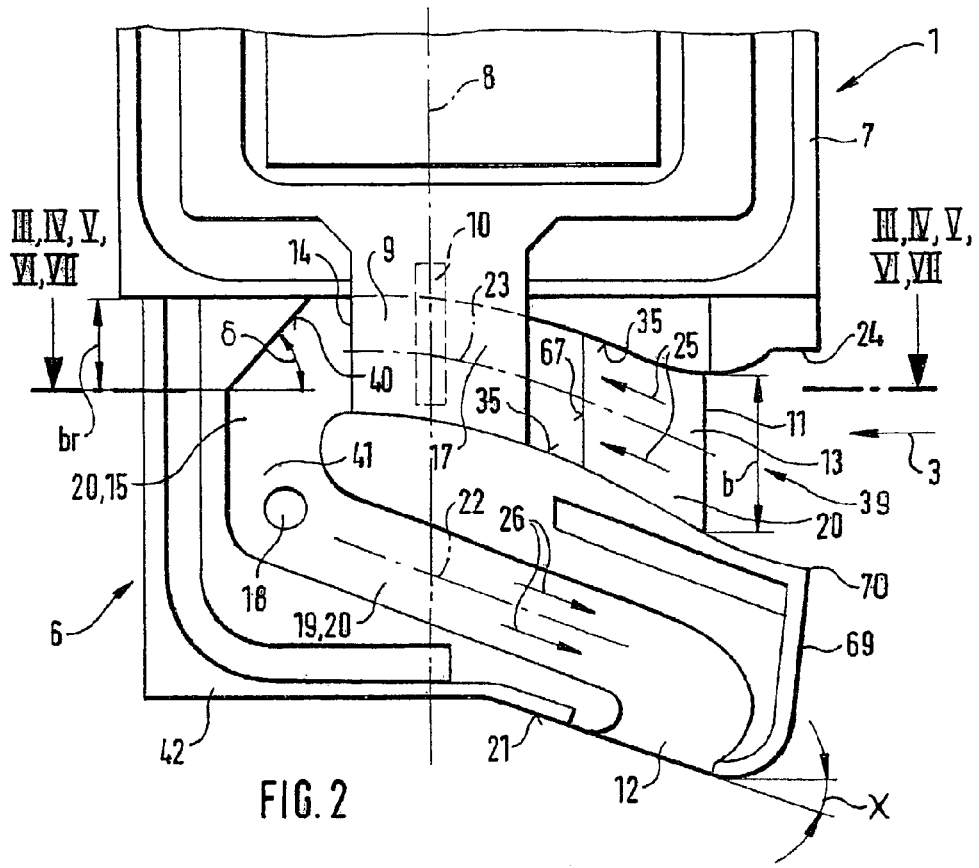
FIG. 2 shows an inlet, deflection, and outlet channel in a measuring housing of the exemplary device according to the present invention.

FIG. 2 shows an exemplary embodiment of measuring housing 6 including a channel 20 without a cover (not shown) which closes channel 20. Channel 20 is formed by a floor part 42 and a cover. Main flow direction 3 of the medium is indicated by arrows. Channel 20 includes, for example, an inlet channel 13, into which the flowing medium flows, a deflection channel 15, into which the flowing medium is deflected, and an outlet channel 19. Flow directions 25, 26 in inlet channel 13 and outlet channel 19 are also identified by arrows. An inlet channel centerline 23 is curved here, for example, since edge surfaces 35 of inlet channel 13 have a streamlined configuration. Outlet channel centerline 22 is, for example, a straight line here. Channel 20 may also be configured without the deflection channel and outlet channel, for example as a channel curved slightly from inlet opening 11 in main flow direction 3 or a continuous straight channel. Any other channel shape is conceivable, even a course perpendicular to longitudinal axis 8.

In a forward region 39 of channel 20 before inlet opening 11, through which the medium flows in, a flow obstruction 24 is provided, for example, which causes defined flow separation which is effective in the channel.

A bow 69 of measuring housing 6 is shaped, for example, so that solid or liquid particles are reflected away from inlet opening 11. For this purpose, bow 69 is slanted in the opposite direction to support part 7. In deflection channel 15, an edge surface 40 is, for example, slanted by an angle δ against main flow direction 3. Angle δ may be in the range of approximately 30 to 60°, but is ideally approximately 45°. Edge surface 40 has a width br, which corresponds to at least two-thirds of width b of inlet opening 11 of inlet channel 13. Furthermore, an opening 18 is, for example, provided in deflection channel 15 which establishes a connection to a medium flowing around device 1. There may also be multiple openings. The opening(s) may be located on side walls 41 and/or lead to a lower outer surface 21 of measuring housing 6 of device 1 including channel 20, in order to establish the connection to line 2, through which the pulsation behavior is i.e., the device measures precisely even in the event of pulsating media disturbances. At the end of outlet channel 19, an outlet opening 12, through which the medium leaves channel 20 again, is located, whose surface forms, for example, an angle δ to main flow direction 3. Outlet opening 12 has, for example, a larger cross-section than outlet channel 19, through which the pulsation behavior is improved. At least one measuring element 10 is, for example, housed in a sensor carrier 9, which projects into inlet channel 13. The part of channel 20 in which measuring element 10 is located is also referred to as measuring channel 17.

The configuration of a measuring element 10 is referred to in German Published Patent Application No. 195 24 634.

Figure 3:
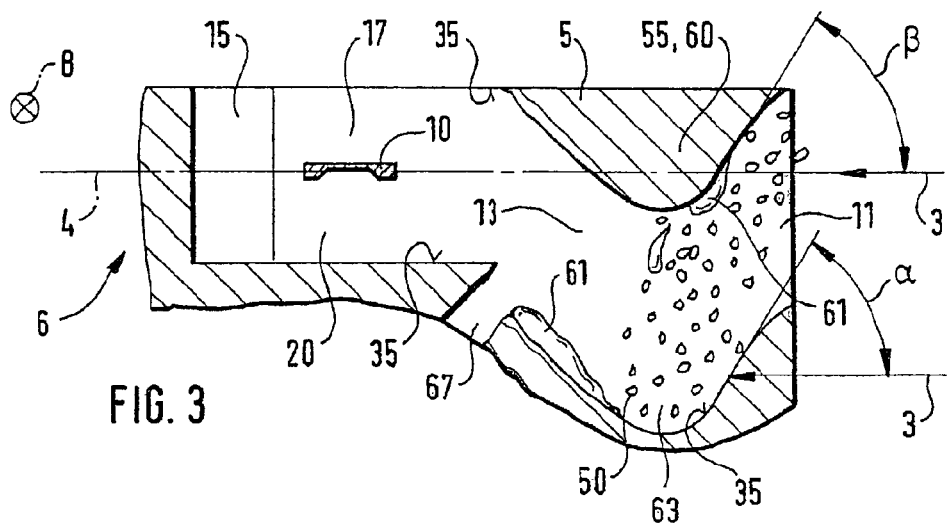
FIG. 3 shows a section along line III—III of FIG. 2 for a first exemplary embodiment of the present invention.

FIG. 3 shows a section along line III—III of FIG. 2. A medium flows in main flow direction 3 which, in addition to gas components, such as air, may also contain other components such as liquid particles 50 or dust particles. If these particles reach measuring element 10, they may damage it. In order to prevent this, an element 55 for particle deflection is positioned upstream from measuring element 10. Element 55 may, for example, be an inlet nozzle, not shown, in wall 5, which blows air in at this location and thus deflects the air flowing in toward the opposite wall, so that it may no longer reach measuring element 10.

In this exemplary embodiment, element 55 is a bulge 60. Liquid particles 50 and other particles flowing in main flow direction 3 hit this bulge 60, which at least partially shadows measuring element 10 in main flow direction 3, and the particles deflect so that they move past measuring element 10 or even leave channel 20 upstream from measuring element 10 through, for example, a particle outlet opening 67 provided. A liquid wall film 61 partially forms on bulge 60, which breaks away at the summit of the bulge as a large drop due to the flow in inlet channel 13 and, for example, is carried along into an indentation 63 of inlet channel 13 present in an edge surface 35 lying approximately opposite bulge 60. Indentation 63 is, for example, approximately matched to the outer shape of bulge 60. A liquid wall film 61 also forms in indentation 63, which moves forward along edge surface 25 downstream toward the medium flow. Downstream from indentation 63, but at least before or at the same axial length as measuring element 10, particle outlet opening 67 is located, for example, through which the particles, particularly liquid particles 50, may leave inlet channel 13 again. Measuring element 10 is thus protected from the impingement of particles. In this case, particle outlet opening 67 is positioned between a flat region of wall 35 and a curved region of wall 35. The particles also partially leave inlet channel 13 directly after deflection by element 55 or by bulge 60. A flow surface of bulge 60 directed against the medium flows forms an angle of intersection β with main flow direction 3. Indentation 63 forms an angle of intersection α with main flow direction 3. The angles of intersection are in the range from 0 to 90°, i.e., bulge 60 and/or indentation 63 are configured slanted in main flow direction 3.

Figure 4:
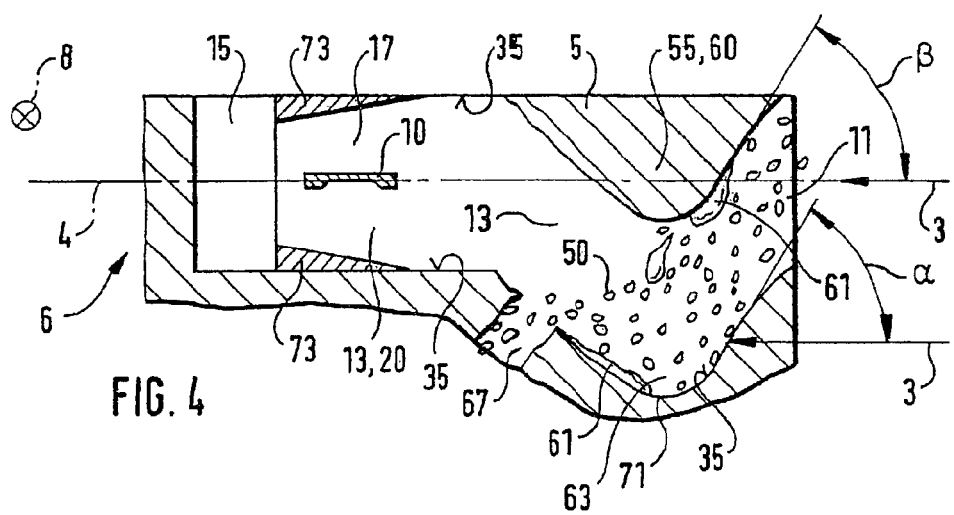
FIG. 4 shows a section along line IV—IV of FIG. 2 for a second exemplary embodiment of the present invention.

FIG. 4 shows a section along line IV—IV of FIG. 2. This exemplary embodiment corresponds to that of FIG. 3 up to the position of particle outlet opening 67. Indentation 63 includes a saddle point 71, which has the greatest distance to a plane which is formed by center line 4 and longitudinal axis 8 and in which measuring element 10 is situated. Outlet opening 67 may be positioned at any location between saddle point 71 and a downstream end of measuring element 10. Particle outlet opening 67 is positioned within a curved region of wall 35 here.

At least one tapering element 73 is, for example, positioned at approximately the same axial height as measuring element 10 in inlet channel 13, which causes acceleration of the flowing medium and stabilization of the measuring behavior of measuring element 10.

Figure 5:
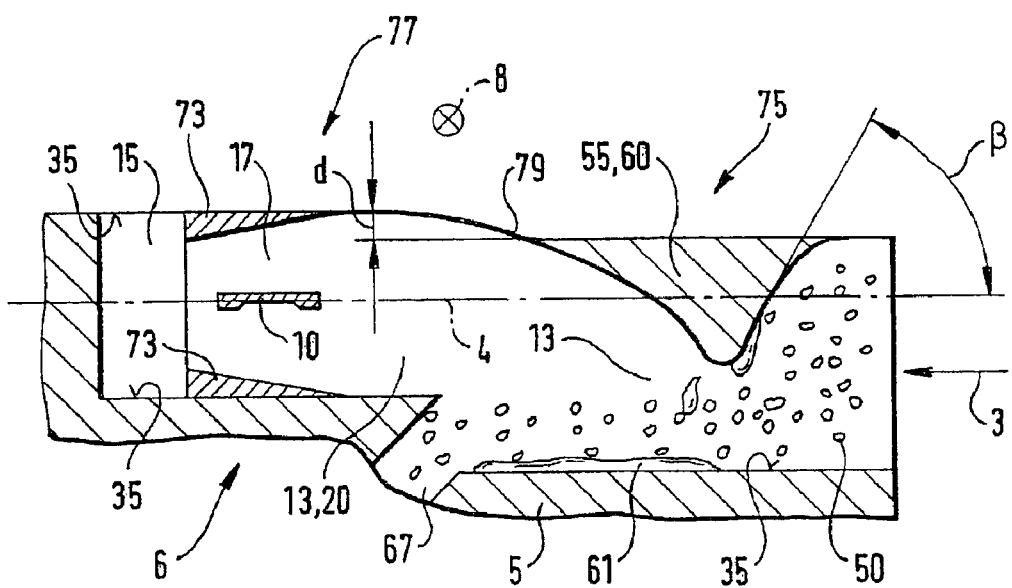
FIG. 5 shows a section along line V—V of FIG. 2 for a third exemplary embodiment of the present invention.

FIG. 5 shows a section along line V—V of FIG. 2 for a further exemplary embodiment.

Wall 35 of inlet channel 13 runs, up to a transition region 79, parallel to a plane which is formed by center line 4 and longitudinal axis 8 in this case. Inlet channel 13 includes a forward region 75 which is displaced, in relation to a rear region 77 of inlet channel 13, by a distance d in a direction perpendicular to center line 4 and longitudinal axis 8 in such a manner that bulge 60 shields measuring element 10 even more. Transition region 79, in which at least one particle outlet opening 67 is implemented on the side of edge surface 35 lying opposite bulge 60, is located between forward region 75 and rear region 77.

Figure 6A:
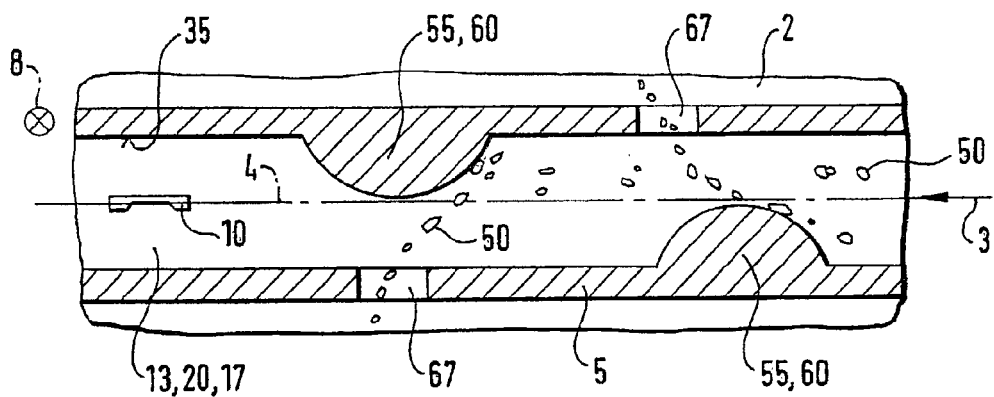
FIG. 6a shows a section along line VI—VI of FIG. 2 for a fourth exemplary embodiment of the present invention.
Figure 6B:
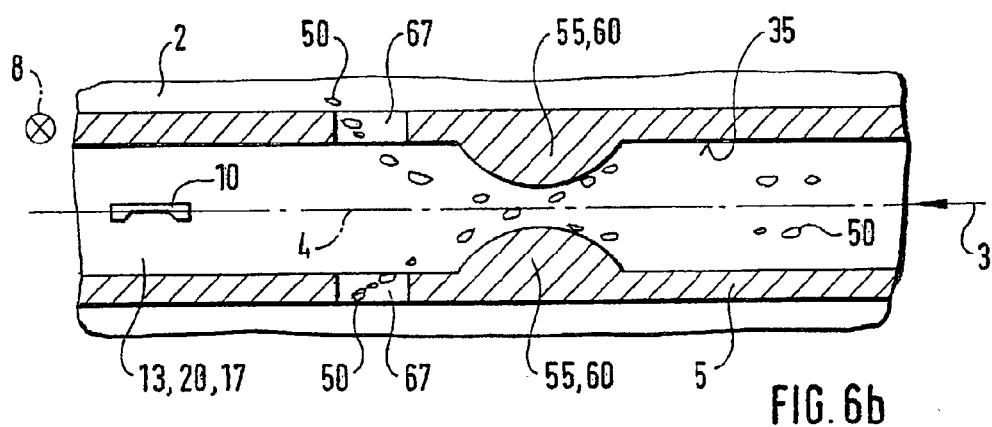
FIG. 6b shows a section along line VI—VI of FIG. 2 for a fifth exemplary embodiment of the present invention.

FIG. 6a and FIG. 6b show further exemplary embodiments of the present invention. For example, two elements 55 for particle deflection are positioned in channel 20. There may also be more elements 55 present. Elements 55 are, for example, each formed by a bulge 60. Bulges 60 are, for example, positioned on opposing edge surfaces 35 of channel 20 and one after another in flow direction 3. At least one particle outlet opening 67 is, for example, provided for each bulge 60 in wall 5, through which the foreign particles, particularly liquid particles 50, may reach line 2.

FIG. 6b shows a further variant of FIG. 6a. In this case, elements 55 are positioned at approximately the same axial height in channel 20. Correspondingly, the two particle outlet openings 67 are positioned opposite one another.

Figure 7:
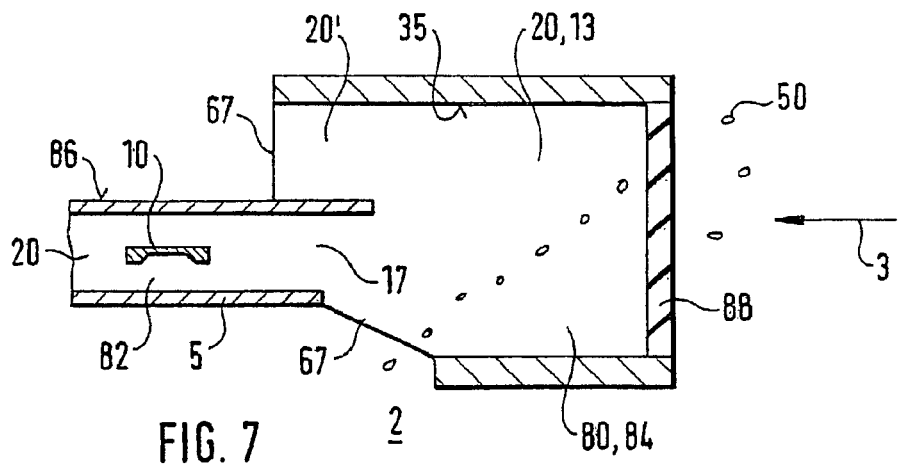
FIG. 7 shows a section along line VII—VII of FIG. 2 for a sixth exemplary embodiment of the present invention.

FIG. 7 shows a further exemplary embodiment of the present invention.

Channel 20 is formed of a first part 80 and a second part 82, second part 82 may be formed by measuring housing 6. First part 80 is, for example, formed by a sleeve 84 made of metal or plastic, which may, for example, be slipped or glued onto measuring housing 6. Sleeve 84 includes, for example, on the front end situated upstream, a rejection grid 88 as an element 55 for particle deflection. Rejection grid 88 deflects foreign particles such as liquid particles 50 so that they are deflected in the direction toward a wall of sleeve 84 and leave channel through a particle outlet opening 67 or are deflected past measuring element 10. Two channels 20, 20' are formed by sleeve 84. Channel 20' is delimited in relation to channel 20 by a dot-dash line and runs, for example, between an outer wall 86 of measuring housing 6 and wall 35 of channel 20'.

Rejection grid 88 is referred to in German Published Patent Application No. 199 42 502.

Figure 8:
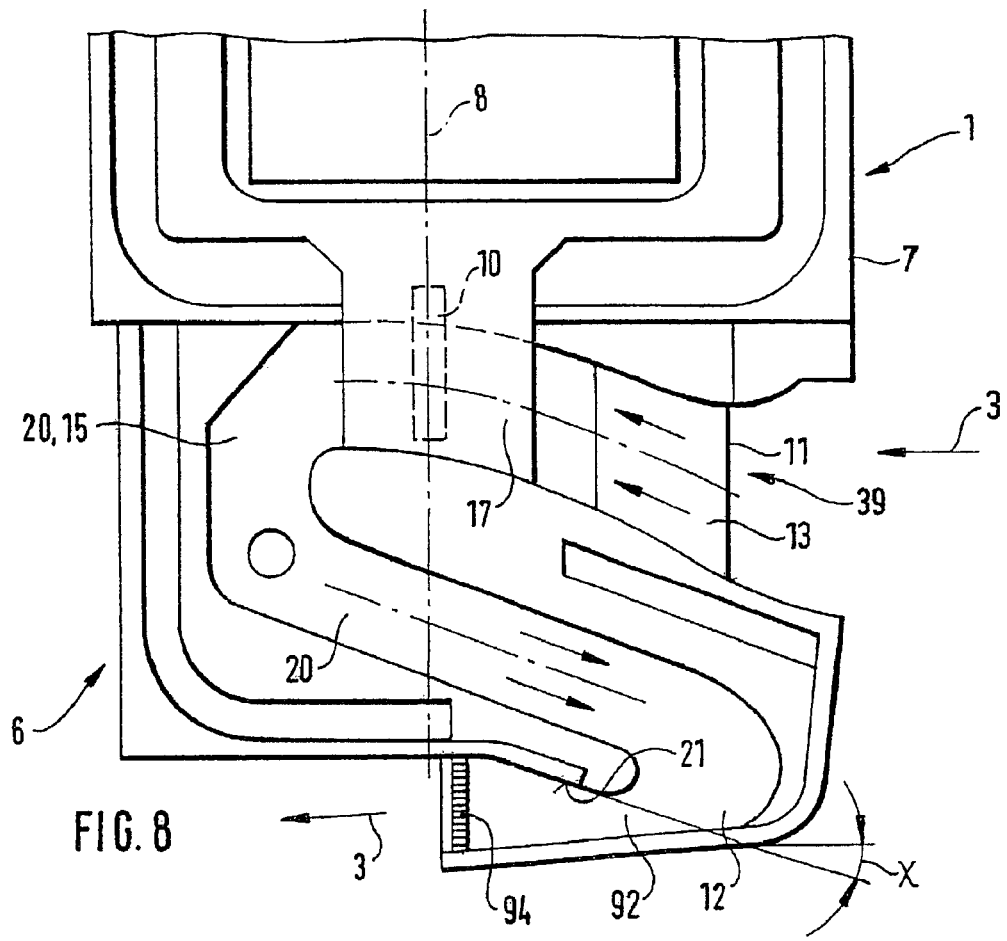
FIG. 8 shows a further exemplary embodiment of the present invention.

FIG. 8 shows a further exemplary embodiment of the present invention. In contrast to FIG. 2, outlet opening 12 of outlet channel 19 is adjoined by, for example, a pulsation channel 92. Pulsation channel 92 improves the measuring behavior of measuring element 10 during pulsations arising in line 2. The flowing medium leaves pulsation channel 92 in, for example, the direction of main flow direction 3. An oil condensation grid 94 is, for example, positioned in the region of a downstream end of pulsation channel 92, which prevents oil from being able to reach channel 20 in the event of backflows. This occurs in that the oil precipitates on appropriately large grid inner surfaces of the walls forming the grid openings.

One or more oil condensation grids 94 may also be positioned in each other inlet opening 11 or outlet opening 12, 67.

What is claimed is:

1. A device for determining at least one parameter of a medium, the medium including a gas-particle mixture of intake air for an internal combustion engine and flowing in a line along a main flow direction, the device comprising:
   a measuring housing arranged in the line;
   at least one channel arranged in the measuring housing and formed by edge surfaces that completely surround the channel;
   at least one measuring element located in the at least one channel, surrounded by the edge surfaces of the channel, and around which the medium flows; and
   at least one deflecting element to deflect particles and liquids that is arranged in the measuring housing on at least one of the edge surfaces of the channel, upstream from the measuring element.

2. The device of claim 1, wherein the at least one deflecting element is formed by at least one bulge.

3. The device of claim 2, wherein the at least one bulge forms an angle of intersection between 90° and 0° with the main flow direction.

4. The device of claim 1, further comprising:
   at least one outlet opening in at least one of the edge surfaces of the channel for the particles and the liquids, and arranged between the at least one deflecting element and the at least one measuring element.

5. The device of claim 1, wherein at least one of the edge surfaces of the at least one channel includes an indentation pointing outward at approximately a same axial length as that of the at least one deflecting element and opposite to it.

6. The device of claim 5, wherein the at least one deflecting element includes at least one bulge, and the indentation is configured in a shape corresponding to that of the at least one bulge.

7. The device of claim 1, wherein a forward part of the at least one channel is offset in relation to a rear part, parallel to the main flow direction.

8. The device of claim 1, wherein at least one channel includes at least one outlet opening having at least one oil rejection grid.

9. The device of claim 1, wherein:
   the at least one channel is divided into an inlet channel, a deflection channel, and an outlet channel; and
   the at least one channel includes an inlet opening, which the inlet channel adjoins and which the deflection channel adjoins, into which the medium flows from the inlet channel and is deflected to flow through the outlet channel to at least one outlet opening on an outer surface of the measuring housing that discharges into the line.

10. The device of claim 1, wherein the at least one deflecting element is configured to protect the at least one measuring element from the particles and liquids.

11. The device of claim 1, wherein a portion of the measuring housing is configured to house at least one analyzing electronics.

12. The device of claim 1, wherein the device is arranged downstream of at least one obstruction configured to regulate the flow to the at least one channel.

13. The device of claim 1, further comprising:
   at least one tapering element configured to accelerate the flow in the at least one channel.

14. The device of claim 1, wherein the at least one deflecting element is formed by at least one bulge on at least one edge surface of the channel.

15. A device for determining at least one parameter of a medium, the medium including a gas-particle mixture of intake air for an internal combustion engine and flowing in a line along a main flow direction, the device comprising:

a measuring housing arranged in the line;

at least one channel arranged in the measuring housing and formed by edge surfaces that completely surround the channel;

at least one measuring element located in the at least one channel, surrounded by the edge surfaces of the, and around which the medium flows; and at least one deflecting element to deflect particles and liquids that is arranged in the measuring housing in the at least one channel, upstream from the measuring element, wherein the at least one deflecting element is formed by at least one rejection grid.

16. A device for determining at least one parameter of a medium, the medium including a gas-particle mixture of intake air for an internal combustion engine and flowing in a line along a main flow direction, the device comprising:

a measuring housing arranged in the line;

at least one channel arranged in the measuring housing and formed by edge surfaces that completely surround the channel;

at least one measuring element located in the at least one channel, surrounded by the edge surfaces of the channel, and around which the medium flows; and at least one deflecting element to deflect particles and liquids arranged around the measuring housing, upstream from the measuring element, wherein the at least one channel includes the edge surfaces having at least two parts, and a first part of the at least one channel is formed by a sleeve arranged on the measuring housing.

17. The device of claim 16, further comprising:

at least one rejection grid arranged in the sleeve.

18. A device for determining at least one parameter of a medium, the medium including a gas-particle mixture of intake air for an internal combustion engine and flowing in a line along a main flow direction, the device comprising:

a measuring housing arranged in the line;

at least one channel arranged in the measuring housing;

at least one measuring element located in the at least one channel, and around which the medium flows; and at least one deflecting element to deflect particles and liquids is arranged one of around and in the measuring housing at least one channel, upstream from the measuring element;

wherein the at least one channel is divided into an inlet channel, a deflection channel, and an outlet channel;

wherein the at least one channel includes an inlet opening, which the inlet channel adjoins and which the deflection channel adjoins, into which the medium flows from the inlet channel and is deflected to flow through the outlet channel to at least one outlet opening on an outer surface of the measuring housing that discharges into the line; and wherein at least one pulsation channel adjoins the at least one outlet opening.

19. The device of claim 18, wherein the at least one pulsation channel includes at least one oil rejection grid.

20. The device of claim 18, wherein the at least one pulsation channel is configured to reduce a backflow.

21. A device for determining at least one parameter of a medium, the medium including a gas-particle mixture of intake air for an internal combustion engine and flowing in a line along a main flow direction, the device comprising:

a measuring housing arranged in the line;

at least one channel arranged in the measuring housing;

at least one measuring element located in the at least one channel, and around which the medium flows; and at least one deflecting element to deflect particles and liquids is arranged one of around and in the measuring housing at least one channel, upstream from the measuring element;

wherein the at least one channel includes a wall having an indentation pointing outward at approximately a same axial length as that of the at least one deflecting element and opposite to it; and wherein the indentation is configured to collect the particles and liquids.

22. A device for determining at least one parameter of a medium, the medium including a gas particle mixture of intake air for an internal combustion engine and flowing in a line along a main flow direction, the device comprising:

a measuring housing arranged in the line;

at least one channel arranged in the measuring housing;

at least one measuring element located in the at least one channel, and around which the medium flows; and at least one deflecting element to deflect particles and liquids is arranged one of around and in the measuring housing at least one channel, upstream from the measuring element;

wherein the at least one channel is serpentinely shaped.

* * * * *

UNITED STATES PATENT AND TRADEMARK OFFICE
CERTIFICATE OF CORRECTION

PATENT NO. : 6,851,309 B2
DATED : February 8, 2005
INVENTOR(S) : Thomas Lenzing et al.

It is certified that error appears in the above-identified patent and that said Letters Patent is hereby corrected as shown below:

Column 7,
Line 10, change "surfaces of the, and" to -- surfaces of the channel, and --.

Signed and Sealed this

Twenty-third Day of August, 2005

JON W. DUDAS
*Director of the United States Patent and Trademark Office*